United States Patent [19]

Deneka et al.

[11] Patent Number: 4,767,430
[45] Date of Patent: Aug. 30, 1988

[54] OPTICAL FIBER-DEVICE INTERCONNECTION AND METHOD

[75] Inventors: Charles W. Deneka, Painted Post; Donald B. Keck, Big Flats, both of N.Y.

[73] Assignee: Corning Glass Works, Corning, N.Y.

[21] Appl. No.: 765,654

[22] Filed: Aug. 15, 1985

[51] Int. Cl.$^4$ ............................................. C03C 25/06
[52] U.S. Cl. ..................................... 65/4.2; 65/4.21; 65/31; 156/637; 156/657; 156/663
[58] Field of Search ............... 65/4.21, 4.2, 3.11, 65/3.2, 3.15, 31; 350/96.15, 96.17, 96.21; 156/637, 657, 663

[56] References Cited

U.S. PATENT DOCUMENTS

| 3,253,896 | 5/1966 | Woodcock | 65/3.11 |
| 3,579,316 | 5/1971 | Dyott | 65/4.21 |
| 3,819,442 | 6/1974 | Brushenko | 65/4.2 |
| 3,883,353 | 5/1975 | Cohen | 156/663 |
| 4,011,007 | 3/1977 | Phaneuf | 65/4.2 |
| 4,291,940 | 9/1981 | Kawasaki | 65/4.2 |
| 4,392,712 | 7/1983 | Ozeki | 350/96.15 |
| 4,666,236 | 5/1987 | Mikami | 350/96.15 |

FOREIGN PATENT DOCUMENTS 2358881 6/1975 Fed. Rep. of Germany ....... 65/4.21
1493992 12/1977 United Kingdom .

Primary Examiner—Kenneth M. Schor
Attorney, Agent, or Firm—William J. Simmons, Jr.

[57] ABSTRACT

A method of preparing an optical device for alignment with a light beam emitter or receiver. The optical device is formed of a first glass that is resistant to dissolving in a given solvent. Extending through the device is an optical waveguide at least the cladding of which is soluble in the given solvent. At least one end of the device is immersed in the solvent to dissolve the end portion of the fiber and form a well. An optical fiber is inserted into the well where it is aligned with the fiber extending through the device.

8 Claims, 2 Drawing Sheets

OPTICAL FIBER-DEVICE INTERCONNECTION AND METHOD

CROSS-REFERENCE TO RELATED APPLICATIONS

This application is related to U.S. patent applications Ser. No. 765,652 entitled "Method of Making Low Loss Fiber Optic Coupler" (D. B. Keck et al.) and Ser. No. 765,655 entitled "Fiber Optic Coupler and Method" (G. E. Berkey), both filed on even date herewith.

BACKGROUND OF THE INVENTION

The present invention relates to the interconnection of an optical fiber and an optical device in predetermined alignment. As used herein the term "optical device" means optical fiber, lens, coupler or the like.

One of the difficult problems associated with implementing an optical fiber system involves the interconnection of the fiber with other optical devices. Present techniques often involve fusion splicing as well as the use of various adhesives in order to firmly hold the component parts together. This however assumes that proper alignment of the light propagating region of the optical fiber has been accomplished. Proper alignment is generally accomplished in one of two ways. Active alignment can be accomplished by propagating a light beam through the system and actively positioning the components to be connected so as to maximize the transmitted power. The pieces are then permanently bonded either directly to one another or to other reference pieces. This technique requires the ability to inject light into the system, a task which is often difficult, particularly in field installations. Further, the precision of the movements required to accomplish the alignment is very high, thus requiring expensive and delicate equipment. An added complication is that during the bonding operation the alignment is often disrupted. For example, adhesive materials can creep during curing, and during fusing operations, surface tension can distort alignment. Problems are also encountered with thermal cycling of the connections, particularly when adhesives are used having much different thermal expansion coefficients than the glass components.

A second alternative is to use the outside surface of the fiber and components as a reference and to position the pieces in V-grooves, channels and the like. This technique works acceptably well for components of the same outside size and shape, eg. fiber-to-fiber. With the disparity of sizes and shapes of many components this technique most likely will not work in all cases.

SUMMARY OF THE INVENTION

It is therefore an object of the present invention to provide alignment methods and components which overcome the disadvantages of the prior art. Another object is to provide a method of precisely aligning an optical fiber with respect to another fiber or an optical device without employing additional alignment mechanisms. A further object is to provide an alignment mechanism for optical devices which is easily fabricated into the device during manufacture thereof.

The present invention pertains to a method of preparing an optical device for interconnection. An optical device is provided which is formed of a first material that is resistant to dissolving in a given solvent, the device having at least one elongated region of a second material that is soluble in the solvent. The elongated region intersects at least one surface of the device which is immersed in a bath of the given solvent to form a well that is adapted to receive a corresponding portion of another device.

One specific embodiment concerns a method of making an optical coupler comprising at least two optical waveguides longitudinally disposed in an elongated boule of transparent matrix glass that is resistant to dissolving in the given solvent. At least the waveguide claddings are soluble in the given solvent. If the waveguide core is sufficiently insoluble in the solvent so that a protrusion is formed in the center of the well, the method further comprises the step of removing the protrusion.

The optical device may comprise an optical fiber in which the elongated region comprises a light-conducting core surrounded by a layer of cladding glass that is soluble in the given solvent. In this embodiment, the fiber is provided with a coating of glass which is insoluble in the solvent. If the fiber core is soluble in a first solvent and insoluble in a second solvent, and the coating on the fiber cladding is insoluble in the first solvent but soluble in the second solvent, one end of the fiber can be immersed in the first solvent whereas the second end is immersed in the second solvent. This causes the formation of a well at one end of the fiber and a protrusion or nib at the other end thereof, whereby the end having a protrusion can be aligned with the well portion of another similar fiber.

The present method may be employed to prepare an optical lens for interconnection with a fiber. There is provided an elongated cylinder of transparent glass formed of a material that is resistant to dissolving in the given solvent. An elongated region of a second material extends axially within the elongated cylinder. The elongated region is formed of a second material that is soluble in the given solvent. The refractive indices of the first and second materials are substantially the same. A section of the elongated cylinder is severed and a curved surface is formed on one end thereof. The end opposite the curved surface is immersed in the solvent to form a well.

A single mode optical fiber of the polarization retaining type can be prepared for alignment with a light emitting or receiving device. The fiber comprises a glass core surrounded by a layer of cladding glass having a refractive index lower than that of the core. The cladding glass is resistant to dissolving in the given solvent. Diametrically opposed regions of glass that are soluble in the given solvent and, additionally, have a thermal coefficient of expansion different from that of the cladding glass are located on diametrically opposed sides of the core. When an end of the fiber is immersed in the given solvent, the end portions of the diametrically opposed glass regions dissolve, thereby forming wells on opposite sides of the core which can be used to orient the fiber with respect to a light emitting or detecting device, a polarizing element or another fiber.

Bonding material is applied to the end of an optical fiber that is inserted into one of the aforementioned wells to secure the fiber to the optical device. The interconnection may additionally include a layer of index matching fluid between the fiber end face and the optical device.

DESCRIPTION OF THE PREFERRED EMBODIMENTS

It is to be noted that the drawings are illustrative and symbolic of the invention, and there is no intention to indicate scale or relative proportions of the elements shown therein.

The present invention involves the use of differentially soluble materials to form in an optical component or device a precision well into which there can be inserted an optical fiber or a protrusion thereon. Following are some specific examples of devices that can be interconnected in this manner.

It has been known that coupling occurs between two closely spaced cores in a multiple core device. The coupling efficiency increases with decreasing core separation and, in the case of single-mode cores, with decreasing core diameter. Said related Keck et al. application relates to a method of fabricating such a coupler. There is initially provided a coupler preform having a plurality of spaced glass cores extending through a boule of matrix glass having a refractive index lower than that of the glass cores. The coupler preform is heated and stretched to form a glass rod which is then severed into a plurality of units in which the cores are flush with the endfaces thereof. Heat is applied to the central region of each of the units while the ends thereof are pulled to elongate and taper inwardly the heated central region thereof, whereby the cores of the unit become more closely spaced and become smaller in diameter in the central region than they are at the ends of the unit. A coupler constructed in this manner can be provided with interconnection means in accordance with the method of the present invention if it is constructed of the proper materials.

Figure 1:
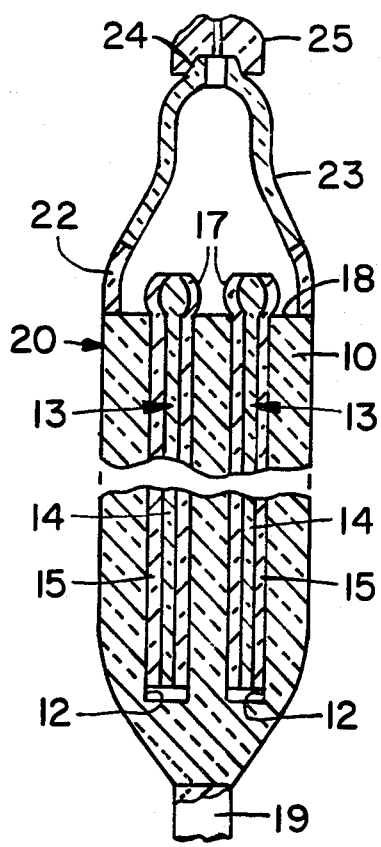
FIG. 1 shows a glass preform that can be utilized in the method of the present invention.

A suitable coupler preform can be formed in the manner illustrated in FIG. 1. Elongated boule 10 of matrix glass can be formed by melting, flame oxidation or the like. The matrix glass, which is resistant to dissolving in a given solvent, may consist of $SiO_2$. Two longitudinal holes 12 are formed in boule 10 by any suitable technique such as core drilling, ultrasonic drilling or the like. Holes 12 are preferably treated to remove imperfections from the walls thereof. For example, the wall-forming surfaces can be smoothed by a diamond hone or grinding powder and/or etched with hydrofluoric acid. However, in a preferred technique, the walls of holes 12 are smoothed by suspending the preform in a furnace and raising its temperature to a level just below that which would cause the preform to elongate. For high $SiO_2$ content blanks this temperature is in the range of 1850°–1900° C.

Into holes 12 are inserted optical fiber preform rods 13, each of which comprises a glass core 14 surrounded by a layer 15 of cladding glass having a refractive index lower than that of the core glass. Preform rods 13 or at least the claddings thereof are more easily dissolved in the given solvent than matrix glass 10. Furthermore, matrix glass 10 should have a refractive index equal to or less than that of cladding glass 15. For example, if matrix glass 10 is $SiO_2$, cores 14 may comprise 10 wt. % $GeO_2$ and 90 wt. % $SiO_2$ and claddings 15 may comprise 11 wt. % $B_2O_3$, 6.1 wt. % $GeO_2$ and 82.9 wt. % $SiO_2$ in which case the refractive index of matrix glass 10 is substantially equal to that of claddings 15.

The following technique may be employed to prevent the fiber preform rods 13 from melting and sliding downwardly into the holes. Upper ends 17 of the rods can be enlarged so that upon insertion of the rods into holes 12, the enlarged ends bind at endface 18 and protrude from the preform. The enlarged end can be formed by heating the end with a flame and pressing the end against a surface to cause it to bulge. The enlarged ends of the rods do not prevent evacuation of the space between the rods and the adjacent walls of the holes.

Figure 2:
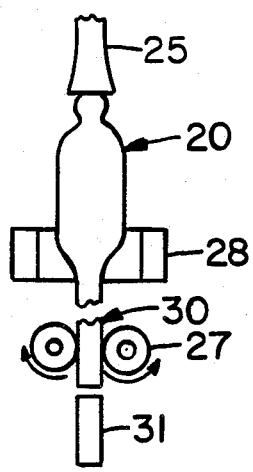
FIG. 2 is a schematic diagram illustrating the stretching of the preform to form a rod.

The assembly illustrated in FIG. 1 is inserted into a conventional draw furnace and stretched as schematically illustrated in FIG. 2. A glass rod 19 (FIG. 1) may be fused to the end of preform 20 to initiate the stretching process. During the stretching process, rods 13 soften and bond to the walls of holes 12. Thus, there is formed an integral coupler preform rod containing substantially no interstices, gaps, bubbles or the like.

A vacuum connection is preferably secured to the top of preform 20 during the stretching operation. This minimizes the amount of gas and water vapor present in the gaps between rods 13 and the walls of holes 12. A preferred method of attaching a vacuum connection is as follows. Prior to inserting rods 13 into holes 12, a tube 22 of high temperature glass such as silica is fused to surface 18. The outer diameter of tube 22 is preferably the same as that of preform 20. If rods 13 had been inserted prior to the fusion of tube 22 to preform 20, the softer glass rods 13 could flow and fill the gaps between the rods and the preform. Thus, when the vacuum is applied over end 18 of the preform, that vacuum would be prevented from communicating with the lower ends of holes 12.

The end of tube 22 opposite the preform may be tapered inwardly. Such a taper can be effected by flameworking the tube. The diameter of the tapered end of the tube should be large enough to permit the insertion of rods 13 therethrough. After rods 13 have been inserted into holes 12, a glass fitting 23 is fused to tube 22. The end of fitting 23 is provided with a ground glass joint 24 to which vacuum connection 25 can be attached.

As shown in FIG. 2, preform 20 is drawn by tractors 27 in furnace 28 to form multicore cane or rod 30. Cane 30 is sliced into numerous units 31 of suitable length.

Figure 3:
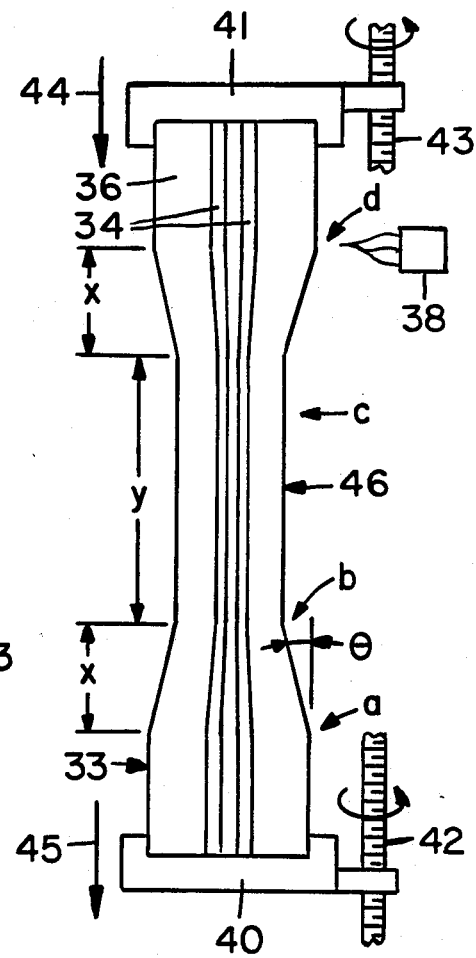
FIG. 3 schematically illustrates the heating and stretching of a severed unit to taper inwardly the central region thereof.

The central region of unit 31 is subjected to a controlled thermal environment while it is stretched to form an elongated or necked-down region of reduced diameter. A preferred method for accomplishing this result is schematically illustrated in FIG. 3. Unit 31 is illustrated as comprising fibers 34 within matrix glass 36. Heat source 38, which must be localized at a narrow axial position, can be a burner, laser or the like, a ring burner being preferred. One end of the unit 31 is inserted through the ring burner, which is represented by a single burner 38 in the drawings. The ends of unit 31 are then clamped to stages 40 and 41. The stages are vertically movable by rotating threaded shafts 42 and 43, respectively, which extend through threaded bores in those stages. Shafts 42 and 43 are connected to motors (not shown) the speed of which can be programmed to vary with respect to time.

Burner 38 is ignited and initially directs a ring of flame inwardly toward unit 31 at point a. Stage 41 begins to move downwardly (arrow 44) at a constant rate of 0.035 cm/sec, and stage 40 begins to move downwardly (arrow 45) at a rate of 0.075 cm/sec. The faster rate of movement of stage 40 causes the unit to become elongated as it moves downwardly through the stationary ring burner. The velocity of stage 40 increases in a linear manner from 0.075 cm/sec to 0.5 cm/sec as the relative position of burner 38 moves from point a to point b on the unit. The velocity of stage 40 remains at 0.5 cm/sec until the relative position of burner 38 coincides with point c. Thereafter, the velocity of stage 40 decreases in a linear manner until it achieves a velocity of 0.05 cm/sec as the relative position of the burner reaches point d. At this time the flame is extinguished and both stages stop moving.

The device 33 thus formed can function as an optical waveguide coupler since light propagating in one core will couple to the other cores in necked down region 46 where the cores are brought closer together and have reduced diameters. Away from necked down region 46, light does not couple from one core to the other since the cores are separated by a distance greater than the coupling distance.

Figure 4:
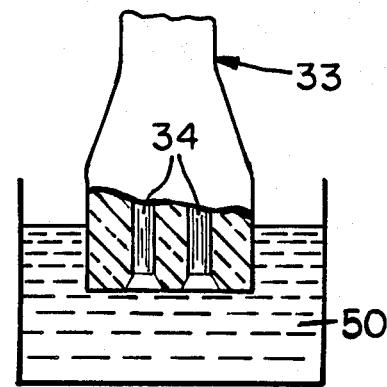
FIG. 4 illustrates an etching technique for forming wells in the end of the device.
Figure 5:
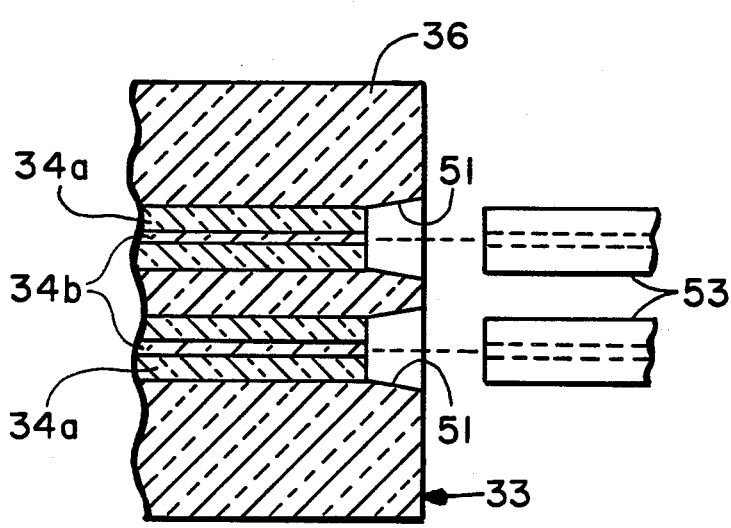
FIG. 5 is a cross-sectional view of an etched device.

The effective utilization of such a coupler requires means for transmitting light to and from coupler fibers 34. In accordance with the present invention this result is accomplished by immersing one or both ends of device 33 in a bath 50 of suitable solvent such as HF acid as shown in FIG. 4. The acid etches or dissolves the fiber cladding material 34a and optionally dissolves the fiber core material 34b, thereby forming precision wells 51 into which fibers 53 may be inserted as shown in FIG. 5.

Figure 6:
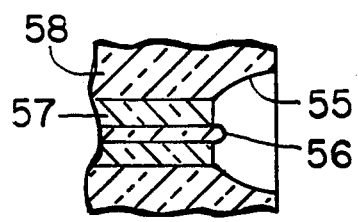
FIG. 6 is a cross-sectional view illustrating the protrusion of core glass into a well.

FIG. 6 illustrates a single well 55 into which there protrudes a nib 56 of fiber core glass. This can be caused by employing a core glass having a sufficiently lower solubility than that of the fiber cladding glass. This nib can be removed by such methods as mechanical fracture or volitalization by a focused $CO_2$ laser beam.

FIG. 6 also shows that well 55 can comprise a rounded lateral wall which may occur depending on the differential etch rates of cladding 57 and matrix glass 58. A greater difference in etch rates will cause steeper, less rounded well walls to be formed.

Diameters of the fibers in coupler 33 are critically important. The core/clad ratio for the fiber perform rods 13 of FIG. 1 should be the same as that of the fibers 53 to which the coupler will be connected. Furthermore, as the coupler preform 20 is stretched (FIG. 2), the diameter reduction of the fiber preform rods should be such that the final diameter of cladding 34a is equal to that of fibers 53. It is noted that the diameter of a typical commercially-available optical fiber is 125 μm. The well diameter is always maintained larger than the diameter of the fiber to be aligned. If the diameter of cladding 34a is the same as that of the cladding of fibers 53, wells 51 will be larger in diameter than fibers 53 due to the lateral etching of matrix glass 36 that occurs even though cladding 34a is being etched more rapidly.

Etching may continue until the well depth is approximately one-half the fiber diameter, although this relationship is not critical. As shown in FIG. 5, some tapering of the well diameter will likely occur, a factor which aids in the insertion and alignment of fibers 53 with the cores 34b.

Figure 7:
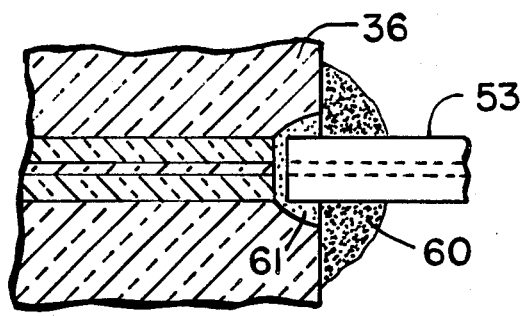
FIG. 7 is a cross-sectional view illustrating the bonding of a fiber to a well.

After insertion of fibers 53 into wells 51, a permanent bond is made by fusion or by use of an adhesive 60 as shown in FIG. 7. The use of an index matching gel 61 adjacent the fiber endfaces will minimize Fresnel reflection loss. Transparent adhesives are available which can be used between fiber endfaces as well as mechanically bonding the fiber to the coupler.

Depending on such factors as diameter of the soluble fiber cladding 34a as well as the relative solubility thereof as compared with that of matrix glass 36, the diameter of well 51 may be sufficiently large that a fiber 53 that is inserted therein is not precisely aligned with the coupler fiber core. Such a condition of non-alignment is more likely to occur with single-mode couplers wherein core diameter is very small. In such a situation, placement of fiber 53 into well 51 causes an approximate alignment of fiber 53 with the coupler core. An active alignment procedure can then be more easily employed to complete the alignment since the nearly perfect alignment gives a measurable starting signal for the detector system. Light can be transmitted through the coupler and fiber. The fiber can be moved within well 51 until maximum light transmission is achieved. The bonding material is then applied, or it is hardened if previously applied.

Figure 8:
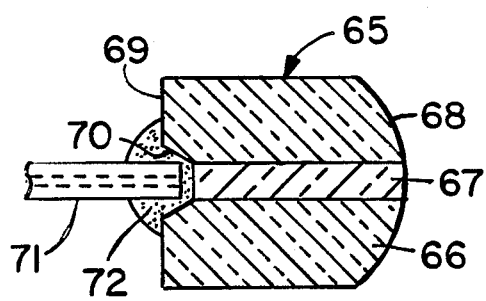
FIG. 8 is a cross-sectional view illustrating the bonding of an optical fiber to the well of a lens.

FIG. 8 illustrates the application of the method of the present invention to a lens 65. Certain devices such as fiber couplers and fiber terminations require means for positioning an optical fiber endface at the focal point of a lens. Lens 65 may comprise a cylindrical body 66 of glass such as $SiO_2$ which is resistant to a solvent such as HF. Body 66 can be formed by any suitable technique such as by deposition of glass particles on a cylindrical mandrel. After a sufficient thickness of particles has been deposited, the mandrel is removed, and the resultant soot preform is consolidated. A rod of soluble glass is inserted into the aperture that is formed by removal of the mandrel. The resultant composite body can be heated and stretched in the manner illustrated in FIG. 2 to achieve the desired outer diameter and to eliminate any interstices that may have been present at the interface between body 66 and the axially disposed rod. The final diameter of the rod should be equal to or slightly greater than the diameter of a fiber that is to be terminated at the lens.

The refractive index of the rod is preferbly equal to that of the cylindrical body 66. For example, if the body is formed of pure $SiO_2$, the axial rod can be formed of 11 wt. % $B_2O_3$, 6.1 wt. % $GeO_2$ and 82.9 wt. % $SiO_2$. The cylindrical body is cut to the desired length and the desired curvature is ground in endface 68. Any curvature such as cylindrical, spherical and the like may be employed. The opposite endface 69 is immersed in a solvent that dissolves axial region 67 to form a well 70. Fiber 71 is inserted into well 70 and bonding material is applied as described above. Index matching gel is not illustrated as being employed in this embodiment, although it obviously may be used. Transparent bonding material 72 is merely applied to the end of fiber 71 prior to inserting it into the well.

Figure 9:
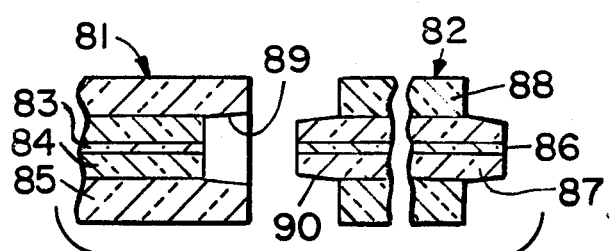
FIGS. 9 and 10 are cross-sectional views illustrating the interconnection of two optical fibers.

An optical fiber can be readied for interconnection with another fiber or with a light source, detector or other device by forming it in the manner illustrated in FIG. 9. Fibers 81 and 82 may both contain a core of 10 wt. % $GeO_2$ and 90 wt. % $SiO_2$. Core 83 of fiber 81 is surrounded by primary cladding 84 the refractive index of which is lower than that of core 83 and secondary cladding 85 the refractive index of which is preferably equal to or lower than that of cladding 84, but which may, under certain circumstances, be greater than that of cladding 84. The relative refractive indices of core 86, primary cladding 87 and secondary cladding 88 of fiber 82 are the same as the corresponding parts of fiber 81. Primary cladding 84 of fiber 81 and secondary cladding 88 of fiber 82 may be formed of 11 wt. % $B_2O_3$, 6.1 wt. % $GeO_2$ and 82.9 wt. % $SiO_2$ which is very soluble in HF. Secondary cladding 85 of fiber 81 and primary cladding 87 of fiber 82 may consist of pure $SiO_2$ which is resistant to dissolution in HF. When an end of fiber 81 is immersed in HF, well 89 is formed as primary cladding 84 dissolves. When an end of fiber 82 is immersed in HF, a nib 90 is formed as secondary cladding 88 dissolves. Fibers 81 and 82 can be aligned for interconnection by inserting nib 90 into well 89 and applying a bonding material as discussed in conjunction with FIG. 7.

Figure 10:
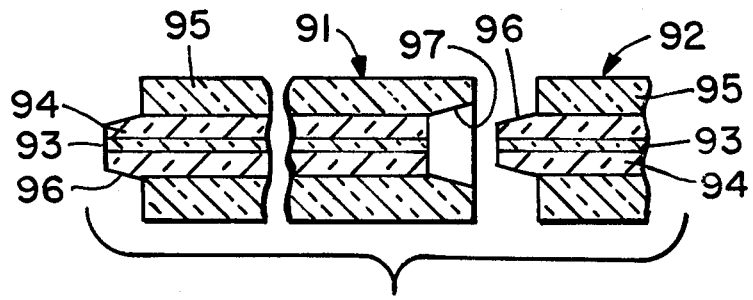

By using different solvents a single fiber structure can be fabricated which will allow formation of either a well or a nib. As shown in FIG. 10, fibers 91 and 92 each comprise a glass core 93 surrounded by a glass cladding layer 94 having a lower refractive index than the core. A coating 95 surrounds cladding 94. Cores 93 and cladding layers 94 are formed of a material that readily dissolves in solvent A but not in solvent B. Coating 95 readily dissolves in solvent B but not in solvent A. For example, cores 93 could be formed of 10 wt. % $GeO_2$, 20 wt. % $B_2O_3$ and 70 wt. % $SiO_2$ while cladding layers 94 could be formed of 30 wt. % $B_2O_3$ and 70 wt. % $SiO_2$. Both of these borosilicate glasses are soluble in HF but are durable in nitric acid. Coatings 95 are formed of an alumino phosphate glass that is durable in HF but is soluble in nitric acid. A suitable composition is 78.1 wt % $P_2O_5$, 18.7 wt. % $Al_2O$, 0.3 wt. % $LiO_2$, 0.7 wt. % $Na_2O$, 1.0 wt. % $K_2O$, 1.0 wt. % ZnO, 0.1 wt. % $As_2O_3$ and 0.1 wt. % $Sb_2O_3$. When ends of fibers 91 and 92 are immersed in nitric acid, coatings 95 dissolve to form nibs 96. When the other ends of such fibers are immersed in HF, the core and cladding layer dissolves to form wells 97. The well end of one fiber is joined to the nib end of another fiber as described above.

Alternatively, both ends of one fiber could be immersed in the same solvent to form, for example, a nib at both ends. Both ends of another fiber could be immersed in another type of solvent to form wells at those ends. Such fibers would then be alternately disposed in a chain of fibers.

Figure 11:
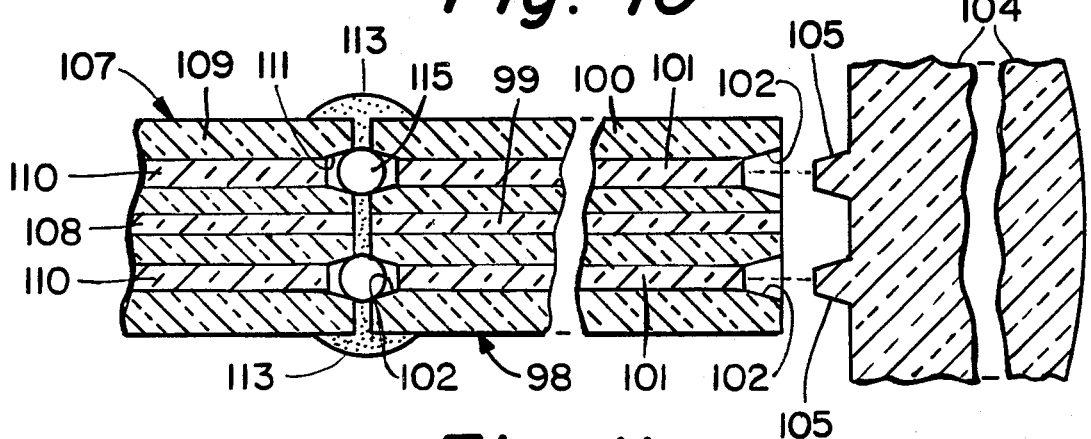
FIG. 11 is a cross-sectional view illustrating the application of the present method to a single-mode polarization retaining fiber.

FIG. 11 shows a single-mode polarization retaining fiber 98 comprising core 99, cladding 100 and stress rods 101. Methods of making fiber 98 are disclosed in U.S. Pat. No. 4,478,489. For example, a plurality of rods of suitable material can be inserted into a tube of cladding material such as $SiO_2$. Centrally disposed within the cladding tube is a rod of core glass such as $GeO_2$-doped $SiO_2$ that is surrounded by the cladding glass. Diametrically disposed with respect to the central rod are two rods of glass having a high temperature coefficient of expansion (TCE) relative to the cladding glass. A suitable material for the high expansion rods is 5 wt. % $P_2O_5$, 12 wt. % $B_2O_3$ and 83 wt. % $SiO_2$. Additional rods of the $SiO_2$ cladding material are inserted into the interstices within the cladding tube. The composite structure is placed in a furnace and drawn into a fiber of the type shown in FIG. 11. One or both ends of the fiber are immersed in HF for a time sufficient to etch wells 102 at the ends of the stress rods 101. Wells 102 can be aligned with corresponding nibs located on light emitting, detecting or propagating devices to ensure the proper coupling of polarized light between these devices.

Fiber 98 may be connected to a glass or plastic lens 104 having integrally molded alignment protrusions 105. Bonding material (not shown) may be applied to the end of the fiber prior to placing the fiber adjacent to lens 104 with protrusions 105 extending into wells 102.

Another method of interconnection is illustrated in FIG. 11. Fiber 107, which is identical to fiber 98, comprises core 108, cladding 109, stress rods 110 and wells 111 at the ends of the stress rods. A layer of bonding material 113 is placed at the end of fiber 98, and a glass bead 115 is inserted into each of the wells 102. Fiber 98 is then butted against fiber 107 in such an orientation that beads 115 are aligned with and become seated in wells 111. A single-mode polarized light signal can thus be propagated through both fibers.

We claim:

1. A method of making an optical device having a well that is adapted to receive a corresponding protrusion on another optical device, said method comprising the steps of providing an optical device formed of a matrix glass that is resistant to dissolving in a given solvent, said device having at least one optical waveguide extending longitudinally therethrough and intersecting at least a first surface of said optical device, said at least one optical waveguide comprising an elongated glass core surrounded by a layer of cladding glass that is soluble in said given solvent, and immersing in a bath of said solvent at least that end of said device having said surface to remove that portion of said cladding glass which is exposed to said solvent to a depth sufficient to form a well the dimensions of which accommodate said protrusion.

2. A method in accordance with claim 1 wherein the step of immersing results in a well having a protrusion of said core glass in the center thereof, said method further comprising the step of removing said protrusion.

3. A method of forming optical fiber alignment wells in an optical device comprising the steps of providing an optical device formed of a matrix glass that is resistant to dissolving in a given solvent, said device having at least two optical waveguides extending longitudinally therethrough, each of said optical waveguides comprising an elongated glass core surrounded by a layer of cladding glass that is soluble in said given solvent, and immersing at least one end of said device into a bath of said solvent to remove that portion of said cladding glass which is exposed to said solvent and thereby form in said at least one end a well at the end of each optical waveguide, the step of immersing being continued until said wells are sufficiently deep that the ends of optical fibers can be inserted therein.

4. A method in accordance with claim 3 wherein the step of providing a device comprises forming a coupler preform having a plurality of glass optical fiber preform rods extending longitudinally through said matrix glass, heating and stretching said preform to form a glass rod, severing said rod into a plurality of units in which the fibers are flush with the endfaces thereof, applying heat to the central region of each of said units, and pulling one end of each of said units relative to the other to elongate and taper inwardly the heated central region thereof, whereby the cores of said unit are more closely spaced and are of smaller diameter at said central region than they are at the ends of said units.

5. A method of aligning an optical fiber with respect to an optical device comprising the steps of providing an optical device formed of a matrix glass that is resistant to dissolving in a given solvent, said device having at least two optical waveguides extending longitudinally therethrough, each of said optical waveguides comprising an elongated glass core surrounded by a layer of cladding glass that is soluble in said given solvent, immersing at least one end of said device into a bath of said solvent to remove that portion of said cladding glass which is exposed to said solvent and thereby form in said at least one end a well at the end of each optical waveguide, the step of immersing being continued until said wells are sufficiently deep that the ends of optical fibers can be inserted therein, providing a plurality of optical fibers, and inserting one of said optical fibers into each of said wells.

6. A method in accordance with claim 5 further comprising the step of bonding said optical fibers to said device.

7. A method in accordance with claim 5 wherein the step of providing a device comprises forming a coupler preform having a plurality of glass optical fiber preform rods extending longitudinally through said matrix glass, heating and stretching said preform to form a glass rod, severing said rod into a plurality of units in which the fibers are flush with the endfaces thereof, applying heat to the central region of each of said units, and pulling one end of each of said units relative to the other to elongate and taper inwardly the heated central region thereof, whereby the cores of said unit are more closely spaced and are of smaller diameter at said central region than they are at the ends of said units.

8. A method in accordance with claim 7 further comprising the step of bonding said optical fibers to said device.

* * * * *